United States Patent
Watekar et al.

(10) Patent No.: US 11,733,459 B2
(45) Date of Patent: Aug. 22, 2023

(54) METHOD FOR MODIFICATION OF SURFACE OF OPTICAL FIBER PREFORM

(71) Applicant: Sterlite Technologies Limited, Aurangabad (IN)

(72) Inventors: Pramod Watekar, Aurangabad (IN); Annesha Maity, Aurangabad (IN); Manoj Mittal, Aurangabad (IN); Sandeep Gaikwad, Aurangabad (IN); Sham Nagarkar, Aurangabad (IN); Bhalchandra Pathak, Aurangabad (IN); Sathis Ram, Aurangabad (IN)

(*) Notice: Subject to any disclaimer, the term of this patent is extended or adjusted under 35 U.S.C. 154(b) by 424 days.

(21) Appl. No.: 16/286,556

(22) Filed: Feb. 26, 2019

(65) Prior Publication Data

US 2020/0209475 A1 Jul. 2, 2020

(30) Foreign Application Priority Data

Dec. 31, 2018 (IN) .............................. 201821050052

(51) Int. Cl.
| | | |
|---|---|---|
| C03B 37/014 | (2006.01) | |
| G02B 6/13 | (2006.01) | |
| G02B 6/02 | (2006.01) | |
| C03B 19/14 | (2006.01) | |
| C03B 29/00 | (2006.01) | |
| C03C 25/002 | (2018.01) | |
| C03C 25/64 | (2006.01) | |
| G02B 6/12 | (2006.01) | |

(52) U.S. Cl.
CPC ............ *G02B 6/13* (2013.01); *C03B 19/1453* (2013.01); *C03B 29/00* (2013.01); *C03B 37/01446* (2013.01); *C03C 25/002* (2013.01); *C03C 25/64* (2013.01); *G02B 6/02052* (2013.01); *G02B 6/02319* (2013.01); *G02B 6/02342* (2013.01); *G02B 2006/12197* (2013.01)

(58) Field of Classification Search
CPC .......... C03B 19/1453; C03B 37/01446; C03C 25/607
See application file for complete search history.

(56) References Cited

U.S. PATENT DOCUMENTS

| | | | | |
|---|---|---|---|---|
| 3,933,454 A | * | 1/1976 | DeLuca | ............ C03B 37/01446 427/167 |
| 4,775,401 A | * | 10/1988 | Fleming | ............ C03B 37/01446 65/395 |
| 4,789,389 A | * | 12/1988 | Schermerhorn | ........ C03B 20/00 501/12 |

(Continued)

*Primary Examiner* — Cynthia Szewczyk
(74) *Attorney, Agent, or Firm* — Steven R. Fairchild; Michael J. Pennington

(57) ABSTRACT

The present disclosure provides a method for modification of surface of an initial optical fiber preform. The initial optical fiber preform is manufactured using at least one preform manufacturing process. The surface of the initial optical fiber preform is treated with 50-70 liters of chlorine per square meter of the surface of the initial optical fiber preform. The surface of the initial optical fiber preform is flame polished using a flame polishing module. The treatment of the surface of the initial optical fiber preform with chlorine and flame polishing of the surface of the initial optical fiber preform collectively converts the initial optical fiber preform into a modified optical fiber preform.

19 Claims, 2 Drawing Sheets

(56) References Cited

U.S. PATENT DOCUMENTS

| | | | | |
|---|---|---|---|---|
| 5,710,850 | A | * | 1/1998 | Watanabe ......... C03B 37/01205 385/51 |
| 6,386,001 | B1 | * | 5/2002 | Shimizu ............ C03B 37/01205 65/377 |
| 6,467,311 | B1 | * | 10/2002 | Fujii ................. C03B 37/01237 65/385 |
| 6,938,443 | B1 | * | 9/2005 | Fabian .............. C03B 37/01211 65/412 |
| 2003/0079504 | A1 | * | 5/2003 | Boek .................. C03B 37/0146 65/424 |
| 2007/0022787 | A1 | * | 2/2007 | Gupta .............. C03B 37/01446 65/416 |

* cited by examiner

METHOD FOR MODIFICATION OF SURFACE OF OPTICAL FIBER PREFORM

FIELD OF THE INVENTION

The present disclosure relates to a field of optical fiber preforms. More particularly, the present disclosure relates to a method for surface modification of an optical fiber preform. The present application is based on, and claims priority from an Indian Application Number 201821050052 filed on 31 Dec. 2018 the disclosure of which is hereby incorporated by reference.

DESCRIPTION OF THE RELATED ART

Over the last few years, there has been an exponential rise in the manufacturing of optical fibers due to an overgrowing demand of the optical fibers. The manufacturing of optical fibers has two major stages. The first stage involves the manufacturing of optical fiber preforms and the second stage involves drawing the optical fibers from the optical fiber preforms. In general, the quality of optical fibers depends on conditions of manufacturing. So, a lot of attention is paid towards the manufacturing of the optical fiber preforms. These optical fiber preforms include an inner glass core surrounded by a glass cladding having a lower index of refraction than the inner glass core.

The optical fiber is manufactured by drawing the optical fiber preform. The drawing of optical fiber preform introduces damages and unevenness in the outer layer of the optical fiber. During drawing of optical fiber preform, particles embedded or loosely attached on the glass preform surface are also considered defects that impair the strength of the fibers during mechanical loading. Impurities and foreign substances attached to surface of the preform results in lower quality of the optical fiber.

In light of the above stated discussion, there is a need for a method to modify structure of outer cladding of optical fiber preform that overcomes the above stated disadvantages and increases the performance of the optical fibers.

BRIEF SUMMARY OF THE INVENTION

In an aspect, the present disclosure provides a method for modification of surface of an initial optical fiber preform. The method includes a first step of treating the surface of the initial optical fiber preform with 50-70 liters of chlorine per square meter of the surface of the initial optical fiber preform. The surface of the initial optical fiber preform is treated with chlorine for modification of structure of silica cladding of the initial optical fiber preform by removing impure particles from the initial optical fiber preform. Further, the method includes another step of performing flame polishing on the surface of the initial optical fiber preform. The flame polishing is performed to convert the initial optical fiber into a modified optical fiber preform. The modified optical fiber preform is free from metallic impurities and impure particles.

In addition, the modified optical fiber preform has a smooth surface with long length tensile strength. The flame polishing is performed at a temperature in a range of about 1000-1400° C. The modified optical fiber preform has a smooth surface with elevated LLT strength. The modified optical fiber preform has reduced proof test breaks.

A primary object of the present disclosure is to modify structure of silica cladding of an optical fiber preform.

Another object of the present disclosure is to remove damages from the surface of the optical fiber preform.

Yet another object of the present disclosure is to remove impure foreign particles from the surface of the optical fiber preform.

Yet another object of the present disclosure is to improve long length tensile strength of the optical fiber preform.

Yet another object of the present disclosure is to reduce proof test breaks and draw breaks from the surface of the optical fiber preform.

In an embodiment of the present disclosure, the surface of the initial optical fiber preform is treated with 50-70 liters of chlorine per square meter of the surface of the initial optical fiber preform.

In an embodiment of the present disclosure, treatment of the surface of the initial optical fiber preform with chlorine facilitates reduction in softening temperature of the surface of the initial optical fiber preform to enable rapid healing of surface cracks of the initial optical fiber preform during flame polishing.

In an embodiment of the present disclosure, the treatment of the surface of the initial optical fiber preform with chlorine dries out the surface of the initial optical fiber preform by making the surface of the initial optical fiber preform free from water and hydroxide ions. The treatment of the surface of the initial optical fiber preform with chlorine discourages adhesion of foreign particles to the surface of the initial optical fiber preform through the formation of metal chlorides which are significantly volatile at treatment temperature to be removed from the surface of initial optical fiber preform. In addition, the treatment of the surface of the initial optical fiber preform with chlorine prevents impure particles to get stuck on the surface of the initial optical fiber preform. The treatment of the surface of the initial optical fiber preform with chlorine enables removal of metallic impurities from the surface of the initial optical fiber preform.

In an embodiment of the present disclosure, the treatment of the surface of the initial optical fiber preform with chlorine provides stress relaxation to the surface of the initial optical fiber preform.

In an embodiment of the present disclosure, the flame polishing of the surface of the initial optical fiber preform is performed at a temperature of about 1000-1400° C. In an embodiment of the present disclosure, the flame polishing is performed on the surface of the initial optical fiber preform to enable removal of residual strain from inside the initial optical fiber preform.

In an embodiment of the present disclosure, the flame polishing is performed on the surface of the initial optical fiber preform to reduce proof test breaks and draw breaks from the surface of the initial optical fiber preform. The flame polishing is performed on the surface of the initial optical fiber preform to provide high proof test yield.

In an embodiment of the present disclosure, the modified optical fiber preform is free from metallic impurities and impure particles. In addition, the modified optical fiber preform has a smooth surface with elevated LLT strength. Further, the modified optical fiber preform has reduced proof test breaks.

In an embodiment of the present disclosure, the initial optical fiber preform is manufactured using at least one preform manufacturing process, wherein the at least one preform manufacturing process includes modified chemical vapor deposition, vapor axial deposition and outside vapor deposition.

DESCRIPTION OF THE DRAWINGS

Figure 1:
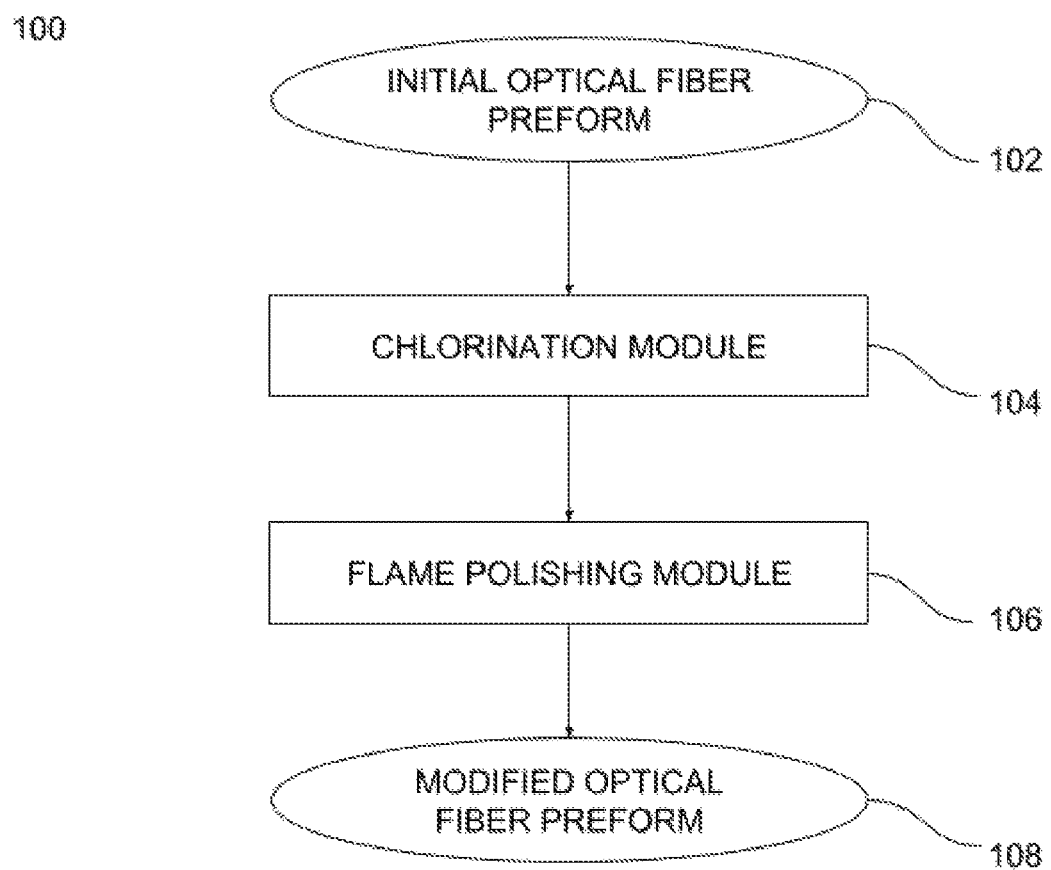
Figure 2:
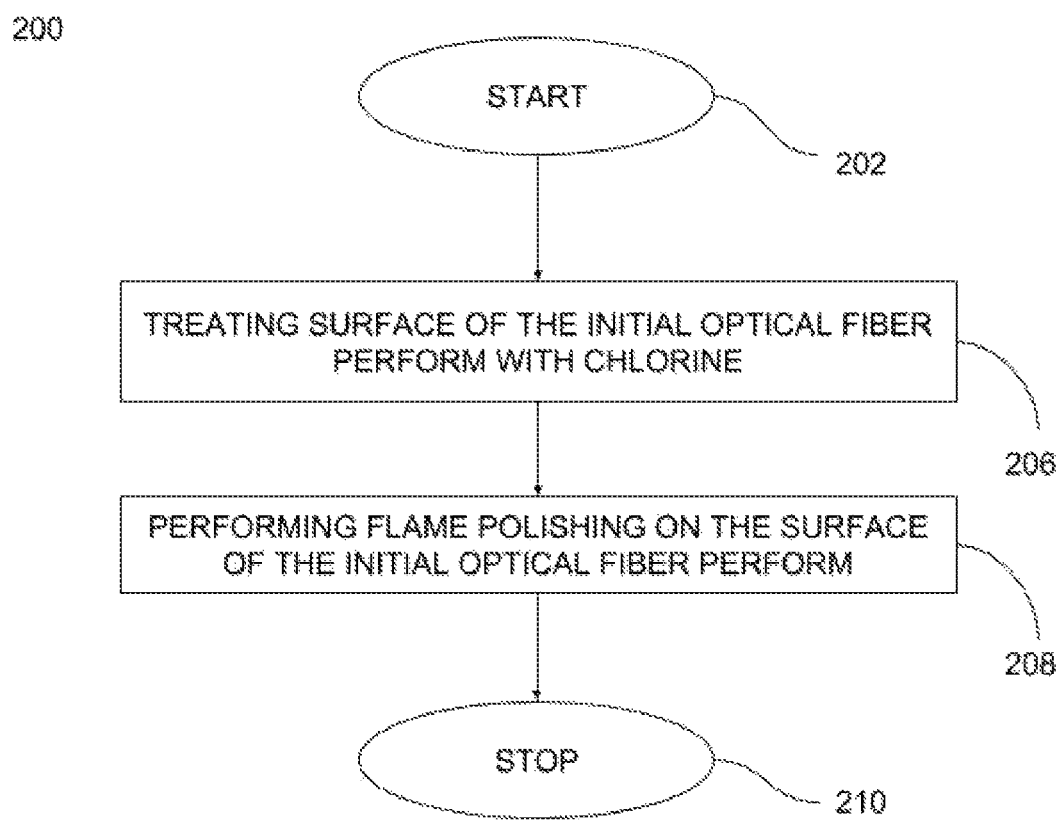

Having thus described the disclosure in general terms, reference will now be made to the accompanying figures, wherein:

FIG. 1 illustrates a general overview of a system for modification of surface of an initial optical fiber preform, in accordance with various embodiments of the present disclosure; and FIG. 2 illustrates a flowchart of a method for the modification of surface of the initial optical fiber preform, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. The system.
102. The initial optical fiber preform.
104. A chlorination module.
106. Flame polishing module.
108. The modified optical fiber preform.
200. Flowchart to explain the process steps.
202. The flowchart initiates at this step (the start step).
206. Treating surface of the initial optical fiber perform with chlorine.
208. Performing flame polishing on the surface of the initial optical fiber perform.
210. The flowchart terminates at this step (the stop step).

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates a general overview of a system 100 for modification of surface of an initial optical fiber preform 102, in accordance with various embodiments of the present disclosure. The system 100 is configured for the modification of the surface of the initial optical fiber preform 102 to reduce proof test breaks. The system 100 includes the initial optical fiber preform 102, a chlorination module 104 and a flame polishing module 106. The above stated functional components of the system 100 collectively perform modification of the surface of the initial optical fiber preform 102.

The system includes the initial optical fiber preform 102. In general, an optical fiber preform is a large cylindrical body of glass having a core structure and a cladding structure. In addition, the optical fiber preform is a material used for fabrication of optical fibers. Accordingly, the optical fibers are used for a number of purposes. The number of purposes includes telecommunications, broadband communications, medical applications, military applications and the like. The optical fiber preform is the optical fiber in a large form. In an embodiment of the present disclosure, the initial optical fiber preform 102 includes a core and a silica cladding. The core is an inner part of the optical fiber preform and the silica cladding is an outer part of the optical fiber preform. In an embodiment of the present disclosure, the system 100 may perform at least one preform manufacturing process for the manufacturing of the initial optical fiber preform 102. The at least one manufacturing process includes but may not be limited to outside vapor deposition (OVD) process, vapor axial deposition (VAD) process, and modified chemical vapor deposition (MCVD) process. The initial optical fiber preform 102 has a rough surface and softening temperature of the initial optical fiber preform 102 is high. The surface of the initial optical fiber preform 102 has high viscosity. In general, viscosity is a quantity expressing the magnitude of internal friction in a fluid.

In an embodiment of the present disclosure, the at least one preform manufacturing process include the outside vapor deposition process (OVD). Generally, in the outside vapor deposition process, a preform is made from ultra-pure vapors using a traversing burner and form fine soot particles of glass. The soot particles are deposited on surface of a rotating target rod. After the deposition of soot particles on the surface of the rotating target rod, the rotating target rod is removed and preform is manufactured.

In another embodiment of the present disclosure, the at least one preform manufacturing process include the vapor axial deposition (VAD) process. In general, the vapor axial deposition process is used to manufacture a porous glass preform. In the vapor axial deposition process, the porous glass preform is fabricated by the deposition of fine glass material onto the end surface of a starting material through flame hydrolysis. The starting material is pulled upward in axial direction and the porous glass preform is grown in the same direction. The starting material is volatile organic compound that includes but may not be limited to SiCl, GeCl and O. The porous glass preform is heated to create a transparent fiber preform.

In yet another embodiment of the present disclosure, the at least one preform manufacturing process include the modified chemical vapor deposition (MCVD) process. In general, the modified chemical vapor deposition process is based on high temperature oxidation of reagents inside a rotating tube. The rotating tube is heated by an external heat source. The chemicals are mixed inside the rotating tube. The external heat source moves along the rotating tube. The rotating tube is collapsed that is then drawn, checked, coated and stored for fiber fabrication.

The system 100 includes the chlorination module 104. The chlorination module 104 enables treating the surface of the initial optical fiber preform 102 with chlorine. In general, chlorine is greenish yellow colored gas at room temperature and at atmospheric pressure. The treatment of the surface of the initial optical fiber preform 102 with chlorine reduces the softening temperature of the surface of the initial optical fiber preform 102. In general, the softening temperature is the temperature at which a material attains a particular degree of softening above an arbitrary softness. The surface of the initial optical fiber preform 102 becomes soften at a low temperature due to the treatment of the surface of the initial optical fiber preform 102 with chlorine. In an embodiment of the present disclosure, the surface of the initial optical fiber preform 102 represents the outer layer of the initial optical fiber preform 102. In other words, the surface of the initial optical fiber preform 102 represent the silica cladding of the initial optical fiber preform 102.

The treatment of the initial optical fiber preform 102 with chlorine reduces viscosity of the surface of the initial optical fiber preform 102. In addition, the treatment of the surface of the initial optical fiber preform 102 with chlorine makes the surface of the initial optical fiber preform 102 dry and prevents impure particles to get stuck on the surface of the initial optical fiber preform 102 during drawing or flame polishing. The impure foreign particles causes defects in the surface of the initial fiber optical preform 102. In an embodiment of the present disclosure, the defects may be in the form of the impure particles. The impure particles include but may not be limited to SI and nick. In addition, the defects may appear in the form of the impure particles embedded or loosely attached on the surface of the initial optical fiber preform 102.

Further, the treatment of the surface of the initial optical fiber preform 102 with chlorine modifies structure of the silica cladding of the initial optical fiber preform 102. Furthermore, the treatment of the surface of the initial optical fiber preform 102 with chlorine causes rapid healing of cracks and removes the defects from the surface of the initial optical fiber preform 102. Moreover, the treatment of the surface of the initial optical fiber preform 102 with chlorine provides stress relaxation to the surface of the initial optical fiber preform 102. The stress relaxation depends on the viscosity of the surface of the initial optical fiber preform 102. The reduced viscosity provides high stress relaxation to the surface of the initial optical fiber preform 102. In an embodiment of the present disclosure, the surface of the initial optical fiber preform 102 is treated with 50-70 liters of chlorine per square meter of the surface of the initial optical fiber preform 102.

In an embodiment of the present disclosure, the treatment of the surface of the initial optical fiber preform 102 reduces abrasion break category of the initial optical fiber preform 102 to 18.63. In an embodiment of the present disclosure, the treatment of the surface of the initial optical fiber preform 102 reduces internal break category of the initial optical fiber preform 102 to 5.03. In an embodiment of the present disclosure, the treatment of the surface of the initial optical fiber preform 102 with chlorine reduces surface inclusion break category of the initial optical fiber preform 102 to 8.81. In an embodiment of the present disclosure, the treatment of the surface of the initial optical fiber preform 102 with chlorine reduces unknown break category of the initial optical fiber preform 102 to 12.08.

The system 100 includes the flame polishing module 106. The flame polishing module 106 performs polishing of the surface of the initial optical fiber preform 102 using a heat source or a flame. In general, the flame polishing is a method of polishing a material by treating the material to heat. In an embodiment of the present disclosure, the flame polishing of the surface of the initial optical fiber preform 102 reduces roughness of the surface of the initial optical fiber preform 102 by removing rough parts of the surface of the initial optical fiber preform 102. In addition, the flame polishing of the surface of the initial optical fiber preform 102 removes damages of the surface of the initial optical fiber preform 102. Further, the flame polishing of the surface of the initial optical fiber preform 102 reduces residual strain inside the initial optical fiber preform 102. Furthermore, the flame polishing of the surface of the initial optical fiber preform 102 enables rapid healing of the surface cracks of the initial optical fiber preform 102. Furthermore, the flame polishing of the surface of the initial optical fiber preform 102 reduces poof test breaks. In general, proof test breaks are defects that are detected during a quality control test of the material. Furthermore, the flame polishing of the surface of the initial optical fiber preform 102 reduces draw breaks from the surface of the initial optical fiber preform 102. In general, draw breaks are the defects that occur on the surface of the initial optical fiber preform 102 during drawing of optical fibers. Moreover, the flame polishing of the surface of the initial optical fiber preform 102 provides high proof test yield. Also, the flame polishing of the surface of the initial optical fiber preform 102 provides high long length tensile strength. The treatment of the surface of the initial optical fiber preform 102 with chlorine facilitates in removing metallic impurities present on the surface of the initial optical fiber preform 102. In an embodiment of the present disclosure, the metallic impurities are present on the surface of the initial optical fiber preform 102 may form metal chlorides. The metal chlorides may become volatile at high temperature during flame polishing. Also, the flame polishing of the surface of the initial optical fiber preform 102 reduces viscosity of the surface of the initial optical fiber preform 102. The reduced viscosity of the surface of the initial optical fiber preform 102 allows the metallic impurities present on the surface of the initial optical fiber preform 102 to flow.

In an embodiment of the present disclosure, the flame polishing module 106 performs the flame polishing of the surface of the initial optical fiber preform 102 at a temperature in a range of about 1000-1400° C. In another embodiment of the present disclosure, the flame polishing module 106 performs the flame polishing of the surface of the initial optical fiber preform 102 at any suitable range of temperature. The treatment of the surface of the initial optical fiber preform 102 with chlorine and flame polishing of the surface of the initial optical fiber preform 102 converts the initial optical fiber preform 102 into a modified optical fiber preform 108. The modified optical fiber preform 108 has a smooth surface. The surface of the modified optical fiber preform 108 has high average long length tensile strength. In addition, the surface of the modified optical fiber preform 108 is free from the metallic impurities and the impure particles.

FIG. 2 illustrates a flowchart 200 of a method for modification of surface of the initial optical fiber preform 102, in accordance with various embodiments of the present disclosure. It may be noted that to explain the process steps of the flowchart 200, references will be made to the system elements of the FIG. 1. The flowchart 200 initiates at step 202 (start).

Following step 202, at step 206, the surface of the initial optical fiber preform 102 is treated with chlorine. The 50-70 liters per square meter of chlorine 102 to treat the surface of the initial optical fiber preform 102. The surface of the initial optical fiber preform 102 is treated with chlorine using the chlorination module 104. The treatment of the surface of the initial optical fiber preform 102 with chlorine reduces softening temperature to cause the crack healing easier during draw of optical fiber. The surface of the initial optical fiber preform 102 becomes soften at a low temperature due to the treatment of the surface of the initial optical fiber preform 102 with chlorine. The treatment of the initial optical fiber preform 102 with chlorine reduces viscosity of the surface of the initial optical fiber preform 102. At step 208, the surface of the initial optical fiber preform 102 is flame polished using the flame polishing module 106. The flame polishing of the surface of the initial optical fiber preform 102 reduces roughness of the surface of the initial optical fiber preform 102 by removing rough parts of the surface of the initial optical fiber preform 102. The flame polishing of the surface of the initial optical fiber preform 102 removes damages of the surface of the initial optical fiber preform 102. The flame polishing of the surface of the initial optical fiber preform 102 reduces residual strain inside the initial optical fiber preform 102. The flame polishing of the surface of the initial optical fiber preform 102 reduces poof test breaks and draw breaks. The treatment of the surface of the initial optical fiber preform 102 with chlorine and flame polishing of the surface of the initial optical fiber preform 102 collectively converts the initial optical fiber preform 102 into the modified optical fiber preform 108. The flowchart 200 terminates at step 210 (the stop step).

It may be noted that the flowchart 200 is explained to have above stated process steps; however, those skilled in the art would appreciate that the flowchart 200 may have more/less number of process steps which may enable all the above stated embodiments of the present disclosure.

The present disclosure provides numerous advantages over the prior art. The present disclosure provides the modified optical fiber preform free from damages and the impure particles. The surface roughness of the initial optical fiber preform is completely eliminated in the modified optical fiber preform. The treatment of the surface of the initial optical fiber preform with chlorine and flame polishing over the surface of the initial optical fiber preform makes the initial optical fiber preform free from cracks and other defects. The present disclosure provides the modified optical fiber preform with high LLT strength and high proof testing yield.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

What we claim is:

1. A method for modification of surface of an initial optical fiber preform, the method comprising:
   treating the surface of the initial optical fiber preform with chlorine, wherein the surface of the initial optical fiber preform is treated with chlorine for modification of structure of silica cladding of the initial optical fiber preform by removing impure particles from the initial optical fiber preform; and
   performing flame polishing on the surface of the initial optical fiber preform subsequently after chlorination, wherein the flame polishing is performed to convert the initial optical fiber preform into a modified optical fiber preform.

2. The method as claimed in claim 1, wherein the surface of the initial optical fiber preform is treated with 50-70 liters of chlorine per square meter of the surface of the initial optical fiber preform.

3. The method as claimed in claim 1, wherein the treatment of the surface of the initial optical fiber preform with chlorine facilitates reduction in softening temperature of the surface of the initial optical fiber preform to enable rapid healing of the surface cracks of the initial optical fiber preform during the flame polishing.

4. The method as claimed in claim 1, wherein the treatment of the surface of the initial optical fiber preform with chlorine dries out the surface of the initial optical fiber preform by making the surface of the initial optical fiber preform free from water and hydroxide ions, wherein the treatment of the surface of the initial optical fiber preform with chlorine discourages adhesion of foreign particles to the surface of the initial optical fiber preform, wherein the treatment of the surface of the initial optical fiber preform with chlorine prevents the impure particles to get stuck on the surface of the initial optical fiber preform, wherein the treatment of the surface of the initial optical fiber preform with chlorine enables removal of metallic impurities from the surface of the initial optical fiber preform.

5. The method as claimed in claim 1, wherein the treatment of the surface of the initial optical fiber preform with chlorine provides stress relaxation to the surface of the initial optical fiber preform.

6. The method as claimed in claim 1, wherein the flame polishing of the surface of the initial optical fiber preform is performed at a temperature in a range of 1000–1400° C.

7. The method as claimed in claim 1, wherein the flame polishing is performed on the surface of the initial optical fiber preform to enable removal of residual strain from inside the initial optical fiber preform.

8. The method as claimed in claim 1, wherein the flame polishing is performed on the surface of the initial optical fiber preform to reduce proof test breaks and draw breaks from the surface of the initial optical fiber preform, wherein the flame polishing is performed on the surface of the initial optical fiber preform to provide high proof test yield.

9. The method as claimed in claim 1, the modified optical fiber preform is free from metallic impurities and the impure particles, wherein the modified optical fiber preform has a smooth surface with elevated long length tensile strength, wherein the modified optical fiber preform has reduced proof test breaks.

10. The method as claimed in claim 1, wherein the initial optical fiber preform is manufactured using at least one preform manufacturing process, wherein the at least one preform manufacturing process comprises modified chemical vapor deposition process, vapor axial deposition process and outside vapor deposition process.

11. A method for modification of surface of an initial optical fiber preform, the method comprising:
treating the surface of the initial optical fiber preform with 50-70 liters of chlorine per square meter of the surface of the initial optical fiber preform, wherein the surface of the initial optical fiber preform is treated with chlorine for modification of structure of silica cladding of the initial optical fiber preform by removing impure particles from the initial optical fiber preform; and
performing flame polishing on the surface of the initial optical fiber preform subsequently after chlorination, wherein the flame polishing is performed to convert the initial optical fiber preform into a modified optical fiber preform, wherein the modified optical fiber preform is free from metallic impurities and the impure particles, wherein the modified optical fiber preform has a smooth surface with elevated long length tensile strength, wherein the modified optical fiber preform has reduced proof test breaks.

12. The method as claimed in claim 11, wherein the treatment of the surface of the initial optical fiber preform with chlorine provides stress relaxation to the surface of the initial optical fiber preform.

13. The method as claimed in claim 11, wherein the treatment of the surface of the initial optical fiber preform with chlorine dries out the surface of the initial optical fiber preform by making the surface of the initial optical fiber preform free from water and hydroxide ions, wherein the treatment of the surface of the initial optical fiber preform with chlorine discourages adhesion of foreign particles to the surface of the initial optical fiber preform, wherein the treatment of the surface of the initial optical fiber preform with chlorine prevents the impure particles to get stuck on the surface of the initial optical fiber preform, wherein the treatment of the surface of the initial optical fiber preform with chlorine enables removal of metallic impurities from the surface of the initial optical fiber preform.

14. The method as claimed in claim 11, wherein the flame polishing is performed on the surface of the initial optical fiber preform to enable removal of residual strain from inside the initial optical fiber preform.

15. The method as claimed in claim 11, wherein the flame polishing of the surface of the initial optical fiber preform is performed at a temperature in a range of 1000–1400° C.

16. The method as claimed in claim 11, wherein the initial optical fiber preform is manufactured using at least one preform manufacturing process, wherein the at least one preform manufacturing process comprises modified chemical vapor deposition process, vapor axial deposition process and outside vapor deposition process.

17. A method for modification of surface of an initial optical fiber preform, the method comprising:
treating the surface of the initial optical fiber preform with 50-70 liters of chlorine per square meter of the surface of the initial optical fiber preform, wherein the surface of the initial optical fiber preform is treated with chlorine for modification of structure of silica cladding of the initial optical fiber preform by removing impure particles from the initial optical fiber preform; and
performing flame polishing on the surface of the initial optical fiber preform subsequently after chlorination, wherein the flame polishing is to convert the initial optical fiber preform into a modified optical fiber preform, wherein the modified optical fiber preform is free from metallic impurities and the impure particles, wherein the modified optical fiber preform has a smooth surface with elevated long length tensile strength, wherein the modified optical fiber preform has reduced proof test breaks, wherein the flame polishing is performed at a temperature in a range of 1000–1400° C.

18. The method as claimed in claim 17, wherein the treatment of the surface of the initial optical fiber preform with chlorine provides stress relaxation to the surface of the initial optical fiber preform.

19. The method as claimed in claim 17, wherein the treatment of the surface of the initial optical fiber preform with chlorine dries out the surface of the initial optical fiber preform by making the surface of the initial optical fiber preform free from water and hydroxide ions, wherein the treatment of the surface of the initial optical fiber preform with chlorine discourages adhesion of foreign particles to the surface of the initial optical fiber preform, wherein the treatment of the surface of the initial optical fiber preform with chlorine prevents the impure particles to get stuck on the surface of the initial optical fiber preform, wherein the treatment of the surface of the initial optical fiber preform with chlorine enables removal of metallic impurities from the surface of the initial optical fiber preform.

* * * * *